United States Patent [19]

Brooks

[11] Patent Number: 5,100,545

[45] Date of Patent: Mar. 31, 1992

[54] SEPARATION TANK

[75] Inventor: Joe G. Brooks, Springdale, Ark.

[73] Assignee: Advanced Environmental Recycling Technologies, Inc., Springdale, Ark.

[21] Appl. No.: 621,613

[22] Filed: Dec. 3, 1990

[51] Int. Cl.⁵ .............................................. B01D 21/02
[52] U.S. Cl. ....................... 210/194; 210/197; 210/523; 210/524; 210/525; 210/532.1; 210/538; 210/540; 209/173; 134/15; 134/104.4; 134/133
[58] Field of Search ...................... 210/194, 195.4, 197, 210/221.2, 220, 523, 524, 525, 532.1, 534, 537, 538, 540; 209/172, 172.5, 173; 134/15, 61, 104.4, 133, 184

[56] References Cited

U.S. PATENT DOCUMENTS

| | | | |
|---|---|---|---|
| 838,756 | 12/1906 | Solliday | 134/104.4 |
| 1,829,544 | 10/1931 | Schilling et al. | 210/523 |
| 1,866,965 | 7/1932 | Clement | 209/173 |
| 2,110,721 | 3/1938 | Fischer | 210/197 |
| 2,711,822 | 6/1955 | Novak | 209/173 |
| 2,764,289 | 9/1956 | Scheid | 209/173 |
| 3,447,683 | 6/1969 | Luce, Jr. | 210/197 |
| 4,436,104 | 3/1984 | Kashiwagi | 134/63 |

FOREIGN PATENT DOCUMENTS 285984 3/1931 Italy .

Primary Examiner—Stanley S. Silverman
Assistant Examiner—Christopher Upton
Attorney, Agent, or Firm—Ross, Howison, Clapp & Korn

[57] ABSTRACT

A separation tank adapted for use in washing and separating recycled polymeric material from contaminants, the separation tank comprising a centrally disposed baffle and being adapted to receive and circulate an aqueous medium around the baffle; transversely mounted, rotatable members adapted to submerge floating material within the aqueous medium; transversely mounted, rotatable members adapted to aggressively agitate the surface of the aqueous medium; and longitudinally spaced sumps disposed in the floor of the tank on the side of the baffle opposite the agitation members to collect contaminants settling out of the aqueous medium; and members adapted to divide the aqueous medium into surface and subsurface portions for the respective recovery of the polymeric material and recirculation of the aqueous medium.

11 Claims, 2 Drawing Sheets

SEPARATION TANK

TECHNICAL FIELD

This invention relates to apparatus specially adapted for use in washing and separating polymeric material, and especially recycled plastic film, from paper and other contaminants.

BACKGROUND OF THE INVENTION

With increased commercial and environmental interest being placed upon the reclamation and reuse of plastics, new and better means are needed for efficiently handling and processing recycled plastics to remove paper and other contaminants.

Wash systems presently being used rely on soaps, solvents and mild agitation, and allow the contaminants to sink away from the plastic over an extended period of time. Such systems may require as long as eight to 12 hours, for example, to separate paper labels and the like from shredded plastic waste.

SUMMARY OF THE INVENTION

According to the present invention, a separation tank is provided that is especially useful for separating polymeric film from paper scraps.

The apparatus disclosed herein is adapted to separate paper and other contaminants such as rocks, dirt, wire, etc. from plastic, especially plastic film, in a liquid system. The apparatus of the invention is adapted to wash and separate plastic particles from contaminants rapidly using aggressive liquid attrition and high dilution.

According to a preferred embodiment of the invention, the separation tank disclosed herein comprises:

a longitudinally extending, centrally disposed baffle adapted to permit circulation of an aqueous wash medium around the baffle within the tank;

means for maintaining a recirculating aqueous wash medium at a predetermined level;

an inlet port adapted to receive an aqueous slurry containing shredded or comminuted polymeric material and contaminants into the separation tank below the surface of the recirculating aqueous wash medium;

means for aggressively agitating the surface of the recirculating aqueous wash medium from the side of the centrally disposed baffle that is proximal to the inlet port;

means for collecting and withdrawing paper and other contaminants from the bottom of the tank on the side of the baffle opposite the inlet port;

means for dividing the flow of recirculating aqueous wash medium on the side of the centrally disposed baffle opposite the inlet port into a surface portion and a subsurface portion;

means for recovering the washed and separated polymeric material from the surface portion of the recirculating aqueous wash medium; and means for directing the subsurface portion of the recirculating aqueous wash medium around the proximal end of the centrally disposed baffle into the region adjacent to the inlet port.

According to a particularly preferred embodiment of the invention, spaces are provided between the end portions of the centrally disposed longitudinal baffle and the end walls of the separation tank that are approximately equal in length to the predetermined depth of the recirculating aqueous wash medium within the tank. The length of the flow path on each side of the centrally disposed, longitudinally extending baffle is preferably from about 6 to about 10 times the depth of the recirculating aqueous wash medium within the tank.

According to another particularly preferred embodiment of the invention, air jets are disposed beneath the surface of the recirculating aqueous wash medium on the side of the centrally disposed baffle that is proximal to the inlet port to increase turbulence within the recirculating aqueous wash medium and promote contact between the polymeric material and the means for aggressively agitating the surface of the wash medium.

According to another preferred embodiment of the invention, means are provided for collecting excess aqueous wash medium drained from the plastic recovered from the surface layer for return to the inlet port of the separation tank.

BRIEF DESCRIPTION OF THE DRAWINGS

The apparatus of the invention is further described and explained in relation to the following drawings in which:

FIG. 3 is a sectional elevation view taken along line 3—3 of FIG. 2; and

FIG. 4 is an enlarged detail cross-sectional elevation view through the wall of the separation tank of the invention, taken along line 4—4 of FIG. 2.

Like reference numerals are used to indicate like parts in all figures of the drawings.

DETAILED DESCRIPTION OF THE INVENTION

Figure 1:
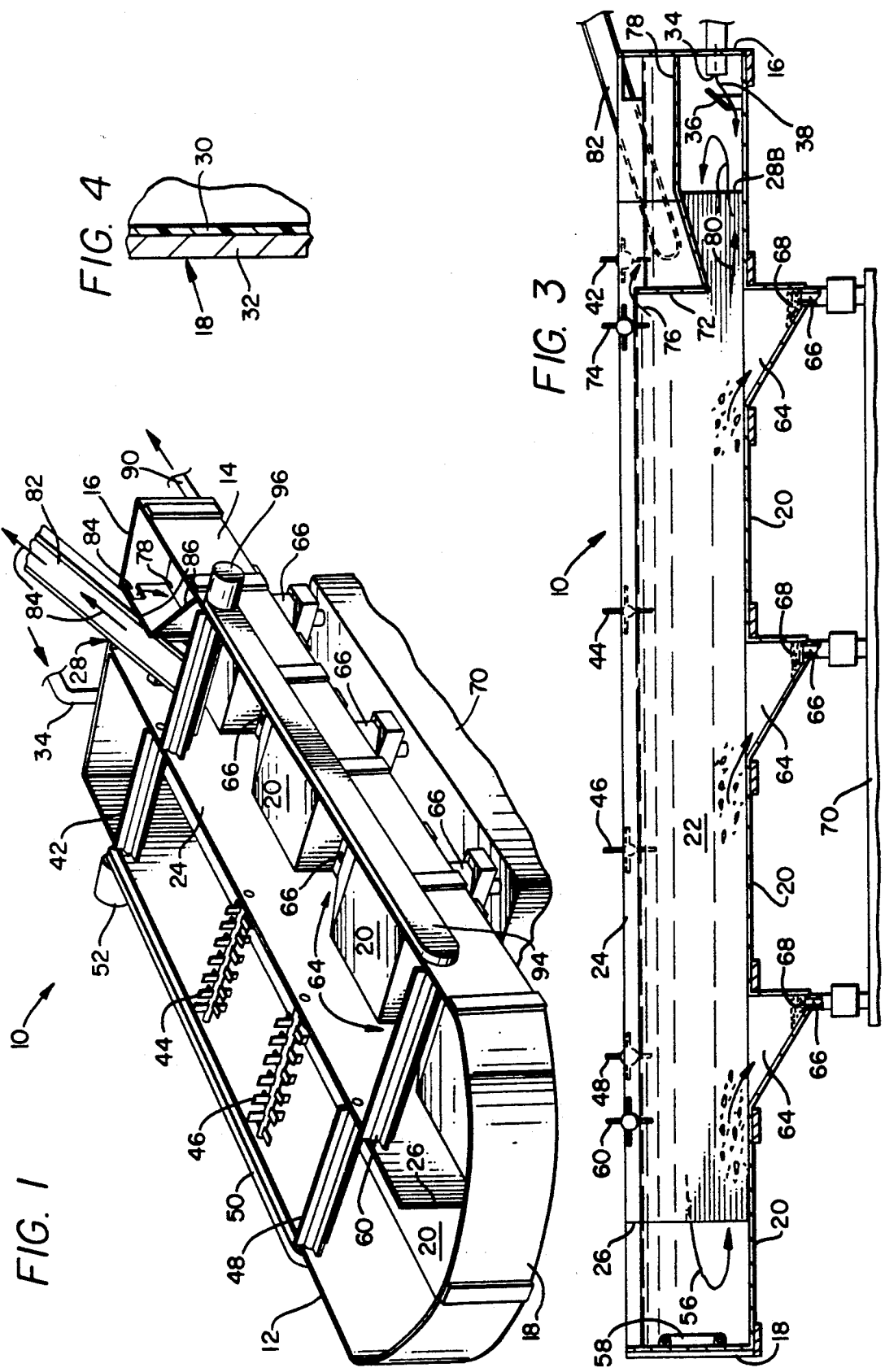
FIG. 1 is a perspective view depicting the separation tank of the invention wherein the recirculating aqueous wash medium is not shown to better illustrate the internals of the subject apparatus.
Figure 2:
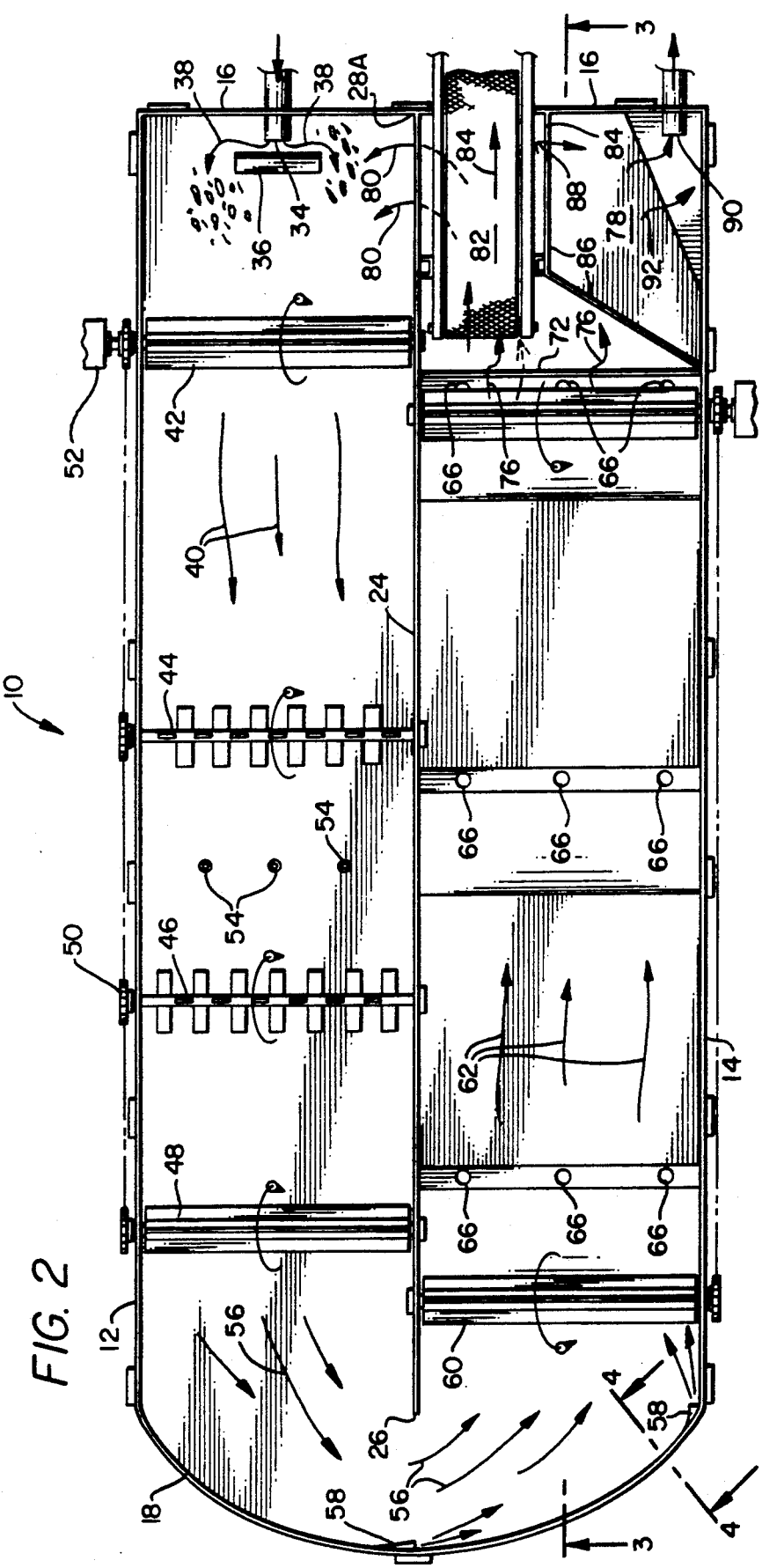
FIG. 2 is a plan view of the separation tank as shown in FIG. 1 with stream lines showing the flow of the recirculating aqueous wash medium through the apparatus.

Referring to FIGS. 1-3, separation tank 10 preferably comprises side walls 12, 14, end walls 16, 18 and bottom 20 adapted to receive a recirculating aqueous wash medium 22 containing polymeric material such as plastic film in combination with contaminants that, when wetted, have a specific gravity greater than that of the solution portion of the wash medium.

According to a preferred embodiment of the invention, the length of separation tank 10 is preferably from about 6 to about 10 times the depth of the aqueous wash medium 22 recirculated in the tank. According to a particularly preferred embodiment of the invention, separation tank 10 has a length ranging from about 32 to about 40 feet, and is adapted to recirculate an aqueous wash medium 22 having a depth of about 4 feet.

Separation tank 10 preferably further comprises a longitudinally-extending, centrally disposed baffle 24. End 26 of baffle 24 is preferably spaced apart from end wall 18 of separation tank 10 a distance approximately equal to the depth of recirculating aqueous wash medium 22 within the tank. Baffle 24 is substantially rectangular in shape, except at end 28 adjacent end wall 16. End 28 of baffle 24 comprises an upper portion 28a that abuts end wall 16 of separation tank 10, and a lower portion 28b that is spaced apart from end wall 16 approximately the same distance that end wall 26 of baffle 24 is separated from end wall 18 of separation tank 10.

Baffle 24 preferably substantially divides the interior portion of separation tank 10 into a first longitudinally-extending section having sides defined by side wall 12 and baffle 24, and a second longitudinally-extending section having side walls defined by side wall 14 and baffle 24. According to a particularly preferred embodiment of the invention, baffle 24 is disposed about 8 feet from each of side walls 12 and 14.

Side walls 12, 14, end walls 16, 18, bottom 20 and baffle 24 are preferably constructed from a metal such as steel having sufficient thickness and reinforcement to contain the recirculating aqueous wash medium 22. According to a particularly preferred embodiment of the invention as shown in FIG. 4 in relation to end wall 18, the walls of separation tank 10 and the centrally disposed baffle 24 comprise a corrosion-resistant coating 30 on the interior-facing surface thereof to reduce the corrosive effects of recirculating aqueous wash medium 22 on metal layer 32 of the respective walls, floor and baffle during prolonged use. Protective layer 30 used for coating the metal surfaces 32 can comprise any suitable corrosion-resistant coating such as, for example, galvanized coatings, polymeric coatings such as polyethylene, and the like.

Although underlying structural support members are not shown for separation tank 10 in the figures of the drawings, it will be understood and appreciated by those of ordinary skill in the art that adequate structural support must be provided to sustain the weights and loadings encountered during use of the subject apparatus.

During use of the subject invention, an aqueous slurry comprising polymeric material and associated contaminants are preferably introduced into separation tank 10 through inlet port 34 disposed near the bottom of end wall 16 approximately midway between side wall 12 and baffle 24. According to a preferred embodiment of the invention, the mixture of polymeric material and water charged to separation tank 10 through inlet port 34 will be such that the volume ratio of water to plastic in recirculating aqueous wash medium 22 will be at least about 8 to 1, and more preferably, about 10 to 1. The concept of using a high dilution rate in combination with aggressive agitation to enhance the separation of plastic material from the associated contaminants is fundamental to the design of the subject apparatus.

When the aqueous slurry containing the materials to be separated enters separation tank 10 through inlet port 34, the flow is preferably directed downward and around baffle 36 as shown by stream lines 38 in FIGS. 2 and 3. After passing baffle 36, wash medium 22 having the polymeric material and contaminants contained therein is directed forcefully along the first longitudinal section defined by side walls 12 and baffle 24 in the direction indicated by stream lines 40 in FIG. 2. As wash medium 22 moves toward end wall 18, the plastic material, having a specific gravity less than that of water, will rise toward the surface while the contaminants, which will generally have a specific gravity greater than that of water, will begin moving toward the bottom.

As wash medium 22 moves toward end wall 18 along the first longitudinal section of separation tank 10, rotatable submerging paddles 42 mounted transversely between side wall 12 and baffle 24 are adapted to submerge any material floating on the surface to a depth of at least from about 4 to about 6 inches below the surface. After passing under submerging paddles 42, the polymeric material again rises to the surface, where it is preferably subjected to aggressive agitation by a plurality of longitudinally-spaced, transversely mounted, rotatable agitator paddles adapted to dislodge the major portion of any remaining contaminants trapped in or adhering to the plastic material. According to a preferred embodiment of the invention, agitator paddles 44, 46 are preferably adapted to extend at least about 4 inches below the top surface of wash medium 22.

Following vigorous agitation by rotatable agitator paddles 44, 46 at or near the surface of wash medium 22, plastic material floating near the surface is again submerged by a rotatable submerging paddle 48 to facilitate separation of the plastic from any contaminants dislodged or stripped away during the agitation. According to the embodiment shown in the drawings, submerging paddles 42, 48 and agitator paddles 44, 46 are rotated by a single chain or belt drive 50 driven by motor 52. It is understood, however, that other similarly satisfactory drive means can be used within the scope of the invention, and that such drive means can include, for example, gears adapted to vary the rotational speeds and/or directions of the respective rotatable paddles.

According to another particularly preferred embodiment of the invention, a plurality of transversely spaced, upwardly directed air jets 54 are provided in separation tank 10 to promote turbulence and force solid matter suspended in wash medium 22 upwardly toward rotating agitator paddles 44, 46 as wash medium 22 moves along the first longitudinal section defined by side wall 12 and baffle 24.

End wall 18 of separation tank 10 is preferably curved so as to promote the flow of wash medium 22 around end 26 of baffle 24 as shown by stream lines 56 in such manner that the direction of flow through the second longitudinal section having side walls defined by side wall 14 and baffle 24 is opposite to the direction of flow on the other side of baffle 24. Deflectors 58 are preferably provided on the interior-facing surface of end wall 18 to assist in redirecting the flow of aqueous medium 22 around baffle 24 toward end wall 16. If desired, deflectors 58 can also incorporate air jets adapted to enhance the circulation of aqueous medium 22 around end 26 of baffle 24.

As plastic material floating at or near the surface of wash medium 22 moves around end 26 of baffle 24, it is again submerged in wash medium 22 by transversely mounted, rotatable submerging paddle 60. Due to reduced agitation as wash medium 22 moves toward end wall 16 through the second longitudinal section defined by side wall 14 and baffle 24 as shown by stream lines 62, the contaminants having a specific gravity greater than that of wash medium 22 tend to settle into one of a plurality of longitudinally spaced sumps 64 that extend transversely across bottom 20 between side wall 14 and baffle 24. Each of sumps 64 preferably further comprises a plurality of transversely spaced drain ports 66 adapted for use in withdrawing and collecting contaminants 68 from sumps 64. Contaminants 68 discharged through drains 66 are collected in holding tank 70 for further processing.

Polymeric material floating at or near the surface of wash medium 22 is preferably swept over baffle 72 by transversely mounted paddle member 74 together with the surface portion of aqueous medium 22 as shown by arrows 76.

The subsurface portion of wash medium 22, containing any polymeric material and/or contaminants still suspended therein, is recirculated around end 28b of baffle 24 under pan 78, as shown by arrows 80, where it is combined with the aqueous slurry of polymeric film and contaminants entering separation tank 10 through inlet port 34.

Polymeric material passing over baffle 72 is collected onto conveyor 82 and transported upward out of separation 10 shown by arrows 84 for de-watering and further processing. Excess liquid recovered from the surface portion of wash medium 22 that passes over baffle 72 with the floating polymeric material flows through window 84 in wall 86 and shown by arrow 88 onto pan 78, and from there down into outlet 90 as shown by arrows 92. Liquid recovered through outlet 90 is desirably recirculated through a conventional pump (not shown) and back into separation tank 10 through inlet port 34 together with additional contaminated polymeric material for which washing and separation are required.

Belt or chain drive 94 and drive means 96 are preferably provided for rotating paddle 60, 74 as previously discussed in connection with the rotatable paddle members disposed on the opposite side of separation tank 10.

Other alterations and modifications of the preferred embodiments disclosed herein will become apparent to those of ordinary skill in the art upon reading the present disclosure, and it is intended that the scope of the invention be limited only by the broadest interpretation of the appended claims to which the applicant is legally entitled.

I claim:

1. A separation tank for use in separating polymeric materials from contaminants in a dilute aqueous medium, said tank comprising:
   first and second side walls, first and second end walls and a floor;
   a longitudinally extending baffle disposed between said first and second side walls, at least a portion of each end of said baffle being spaced apart from the nearest respective end wall of said tank to permit the circulation of said aqueous medium around said baffle;
   inlet means for said aqueous medium, said inlet means being disposed in said first end wall of said tank in a position transversely disposed between said first side wall of said tank and said baffle;
   at least one rotatable means mounted transversely between said first side wall and said baffle for submerging polymeric material beneath the surface of the aqueous medium within said tank;
   at least one rotatable means transversely mounted between said first side wall and said baffle for to aggressively agitating the surface of said aqueous medium;
   means for directing said aqueous medium around said baffle in such manner that the direction of flow between said second side wall and said baffle will be generally countercurrent to the direction of flow of said aqueous medium between said first side wall and said baffle in an area near said second end wall;
   rotatable means transversely mounted between said second wall of said tank and said baffle for submerging said polymeric material beneath the surface of said aqueous medium;
   means disposed in the floor of said tank between said second side wall and said baffle for collecting contaminants that settle out of said aqueous medium;
   means proximal to said first end wall between said second side wall and said baffle for dividing said aqueous medium into a surface portion and a subsurface portion;
   means for recovering polymeric material from said surface portion of said aqueous medium; and
   means for recirculating said subsurface portion of said aqueous medium around said baffle near said first end wall of said tank.

2. The separation tank of claim 1 wherein the length of said tank is from about 6 to about 10 times the depth of said aqueous medium in said tank.

3. The separation tank of claim 1 wherein said longitudinally disposed baffle is centrally disposed between said first side wall and said second side wall.

4. The separation tank of claim 1 wherein said baffle comprises a first end portion that is spaced apart from the first end wall of said tank by a distance equal to about the depth of said aqueous medium.

5. The separation tank of claim 1 wherein said baffle comprises a second end portion spaced apart from said second end wall by a distance equal to about the depth of said aqueous medium.

6. The separation tank of claim 1 wherein said baffle comprises an upper first end portion that is adjacent to the first end wall of said tank and a lower first end portion that is spaced from said first end wall.

7. The separation tank of claim 1, further comprising a deflector means disposed inwardly of said inlet means, said deflector means being adapted to downwardly deflect said aqueous medium.

8. The separation tank of claim 1, further comprising means disposed between said baffle and said first side wall for injecting air into said aqueous medium.

9. The separation tank of claim 1 comprising a plurality of longitudinally spaced, rotatable means transversely mounted between the first side wall and said baffle for submerging polymeric material beneath the surface of the aqueous medium within the tank.

10. The separation tank of claim 1 comprising a plurality of longitudinally spaced, rotatable means mounted transversely between said first side wall and said baffle for aggressively agitating the surface of said aqueous medium.

11. The separation tank of claim 1 wherein the means disposed in the floor of said tank between said second side wall and said baffle comprises a plurality of longitudinally spaced means for collecting contaminants that settle out of said aqueous medium.

* * * * *